US012579314B1

(12) United States Patent
Marimuthu et al.

(10) Patent No.: US 12,579,314 B1
(45) Date of Patent: Mar. 17, 2026

(54) SYSTEMS AND METHODS FOR DYNAMICALLY DISABLING THIRD-PARTY WEB BROWSER EXTENSIONS DURING ONLINE BROWSING SESSIONS

(71) Applicant: GEN DIGITAL INC., Tempe, AZ (US)

(72) Inventors: Venkadesan Marimuthu, Chennai (IN); SriHarsha Angara, Fremont, CA (US)

(73) Assignee: Gen Digital Inc., Tempe, AZ (US)

( * ) Notice: Subject to any disclaimer, the term of this patent is extended or adjusted under 35 U.S.C. 154(b) by 189 days.

(21) Appl. No.: 18/323,246

(22) Filed: May 24, 2023

(51) Int. Cl.
*G06F 21/62* (2013.01)
*G06F 16/958* (2019.01)

(52) U.S. Cl.
CPC ........ *G06F 21/6263* (2013.01); *G06F 16/986* (2019.01)

(58) Field of Classification Search
CPC . G06F 21/6245; G06F 21/6254; G06F 16/986
See application file for complete search history.

(56) References Cited

U.S. PATENT DOCUMENTS

| | | | |
|---|---|---|---|
| 8,181,254 B1 * | 5/2012 | Kay | ........................ G06F 21/51 713/168 |
| 2005/0229104 A1 * | 10/2005 | Franco | ................ G06F 9/44526 715/749 |
| 2018/0121559 A1 * | 5/2018 | Bare | ..................... G06F 16/252 |
| 2022/0222089 A1 * | 7/2022 | Joshi | ..................... G06F 16/953 |

OTHER PUBLICATIONS

Disable Extensions Temporarily, Chrome Web Store, https://chrome.google.com/webstore/detail/disable-extensions-tempor/lcfdefmogcogicollfebhgjiiakbjdje?hl=en; Mar. 16, 2020.

* cited by examiner

*Primary Examiner* — Joe Chacko
(74) *Attorney, Agent, or Firm* — Greenberg Traurig, LLP

(57) ABSTRACT

A computer-implemented method for dynamically disabling third-party web browser extensions during online browsing sessions may include (i) detecting initiation of a target online browsing session including one or more websites, (ii) determining browser extensions associated with the websites, and (iii) performing a security action that protects against a data privacy invasion by disabling the browser extensions for a duration of the target online browsing session. Various other methods, systems, and computer-readable media are also disclosed.

20 Claims, 8 Drawing Sheets

200

300

Start

Detect initiation of a target online browsing session including one or more websites
302

Determine browser extensions associated with the websites
304

Perform a security action that protects against a data privacy invasion by disabling the browser extensions for a duration of the target online browsing session
306

End

Network Architecture 800

SYSTEMS AND METHODS FOR DYNAMICALLY DISABLING THIRD-PARTY WEB BROWSER EXTENSIONS DURING ONLINE BROWSING SESSIONS

BACKGROUND

Web browsers may often utilize browser extensions to perform a number of potentially privacy invasive tasks such as tracking user website visits, capturing passwords/personal information, injecting content scripts into rendered web pages, etc. While the tasks performed by many browser extensions are often benign (e.g., facilitating user account logins, account registrations, online financial transactions, etc.), in some instances, they may also be utilized for malicious purposes by bad actors to steal user credentials or compromise online user privacy and security during web browsing sessions.

Traditional approaches utilized by security applications for mitigating malicious browser extensions may often include techniques including "extension stores" that continuously monitor web browsing sessions to detect and identify previously disclosed malicious extensions. However, these traditional approaches often miss detecting many widespread extensions in use for extended periods (e.g., up to several months) that are later found to be malicious by other means.

SUMMARY

As will be described in greater detail below, the present disclosure describes various systems and methods for dynamically disabling third-party web browser extensions during online browsing sessions.

In one example, a method for dynamically disabling third-party web browser extensions during online browsing sessions may include (i) detecting, by one or more computing devices, initiation of a target online browsing session including one or more websites, (ii) determining, by the one or more computing devices, one or more browser extensions associated with the websites, and (iii) performing, by the one or more computing devices, a security action that protects against a data privacy invasion by disabling the browser extensions for a duration of the target online browsing session.

In some examples, the initiation of the target online browsing session may be detected by (i) detecting a candidate website loading in a browser, (ii) determining that the candidate website is associated with a capture of personally identifiable information (PII) utilizing the browser extensions, and (iii) identifying the initiation of the target online browsing session upon determining that the candidate website is associated with the capture of the PII. In some examples, the candidate website may be determined to be associated with the capture of the PII by determining that the candidate website includes one or more forms for receiving the PII. Additionally or alternatively, the candidate website may be determined to be associated with the capture of the PII by determining that the candidate website belongs to a website category associated with capturing the PII. Additionally or alternatively, the candidate website may be determined to be associated with the capture of the PII by (i) querying a reputation database for reputation data associated with the candidate website and (ii) determining that the candidate website is associated with the capture of the PII based on the reputation data.

In some examples, the browser extensions associated with the websites may be determined by calling a browser management application programming interface (API) to retrieve a list of the browser extensions. In some examples, the security action may be performed by calling one or more browser management APIs configured to disable the browser extensions for the duration of the target online browsing session. Additionally, the security action may include (i) detecting a termination of the target online browsing session and (ii) enabling the browser extensions following the termination of the target online browsing session. Additionally or alternatively, the security action may be performed by (i) retrieving a list of allowable browser extensions, (ii) comparing the browser extensions associated with the websites to the list of the allowable browser extensions, (iii) maintaining the browser extensions matching the list of the allowable browser extensions for the duration of the target online browsing session, and (iv) disabling the browser extensions not matching the list of the allowable browser extensions for the duration of the target online browsing session. Additionally or alternatively, the security action may be performed by (i) identifying a browser session tab associated with the target online browsing session as an active tab, (ii) detecting a selection of another browser session tab associated with a non-target online browsing session, (iii) updating the another browser session tab as the active tab and the browser session tab as an inactive tab, and (iv) enabling the browser extensions associated with the target online browsing session in the inactive tab. Alternatively, performing the security action may include (i) identifying a browser session tab associated with the target online browsing session as an active tab, (ii) detecting a selection of another browser session tab associated with a non-target online browsing session, (iii) updating the another browser session tab as the active tab and the browser session tab as an inactive tab, and (iv) persisting the disabled browser extensions associated with the target online browsing session in the inactive tab.

In one embodiment, a system for dynamically disabling third-party web browser extensions during online browsing sessions may include at least one physical processor and physical memory comprising computer-executable instructions and one or more modules that, when executed by the physical processor, cause the physical processor to (i) detect, by a detection module, initiation of a target online browsing session comprising one or more websites, (ii) determine, by a determining module, one or more browser extensions associated with the websites, and (iii) perform, by a security module, a security action that protects against a data privacy invasion by disabling the browser extensions for a duration of the target online browsing session.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect initiation of a target online browsing session comprising one or more websites, (ii) determine one or more browser extensions associated with the websites, and (iii) perform a security action that protects against a data privacy invasion by disabling the browser extensions for a duration of the target online browsing session.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
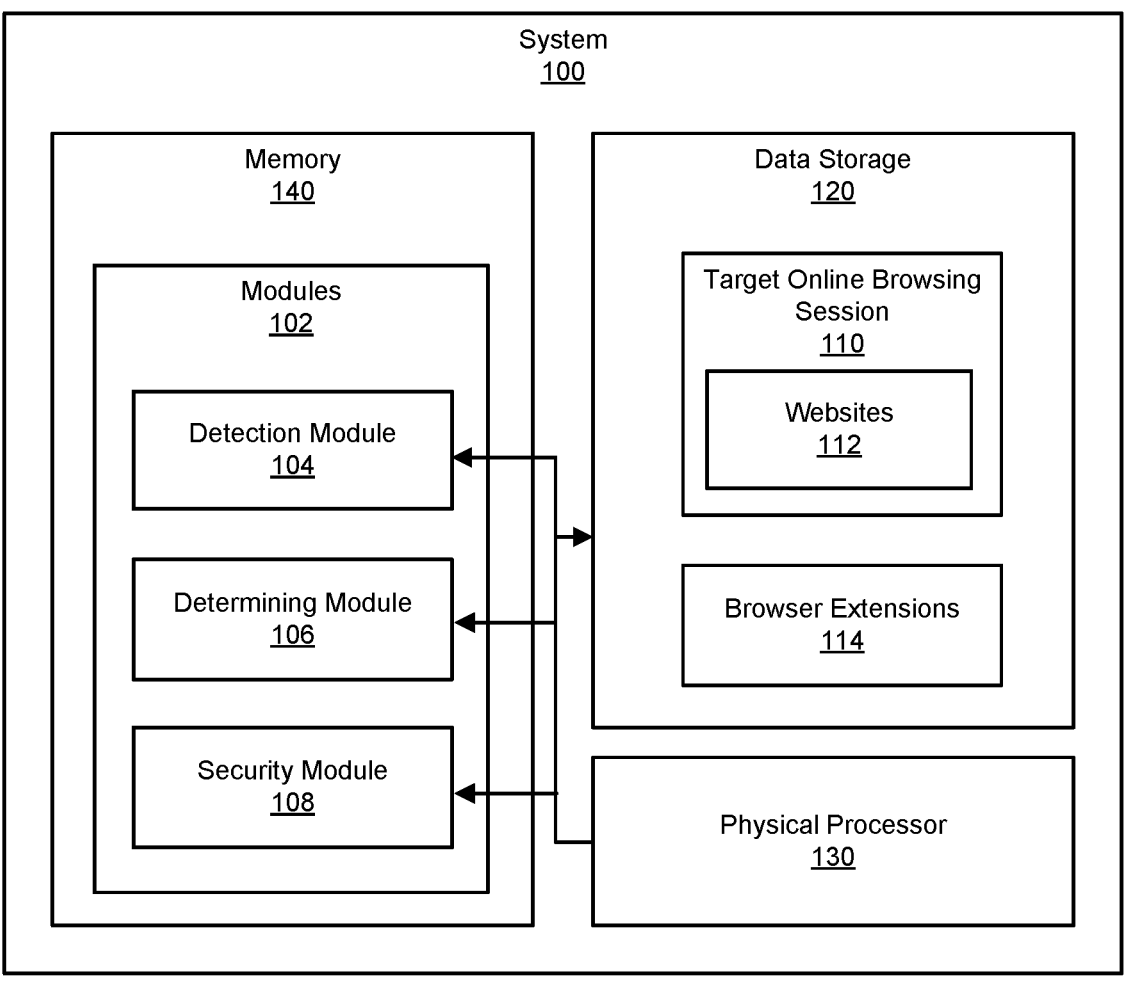
FIG. 1 is a block diagram of an example system for dynamically disabling third-party web browser extensions during online browsing sessions.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for dynamically disabling third-party web browser extensions during online browsing sessions. As will be described in greater detail below, by utilizing browser management APIs to temporarily disable third-party browser extensions in web pages upon detecting critical online transaction sessions (e.g., web pages utilizing forms for collecting user financial information, login information, or other personally identifiable information (PII)), the systems and methods described herein may protect users against potential data privacy invasions by malicious extensions configured to steal PII and compromise user privacy/security. Upon conclusion of a critical online transaction session (e.g., upon the user moving to different browser web page tab or exiting a browser application), the systems and methods described herein may further re-enable the third-party browser extensions and, in some examples, warn the user that a transaction in an inactive but still open web page tab may still pose a data privacy risk. The systems and methods described herein may further enable users to override the disabling of selected third-party extensions (e.g., for extensions known by the user to be safe) during critical online transactions. Moreover, the systems and methods described herein may improve the field of computing device security by providing data privacy against malicious browser extensions during user web browsing sessions when PII is communicated online.

Figure 2:
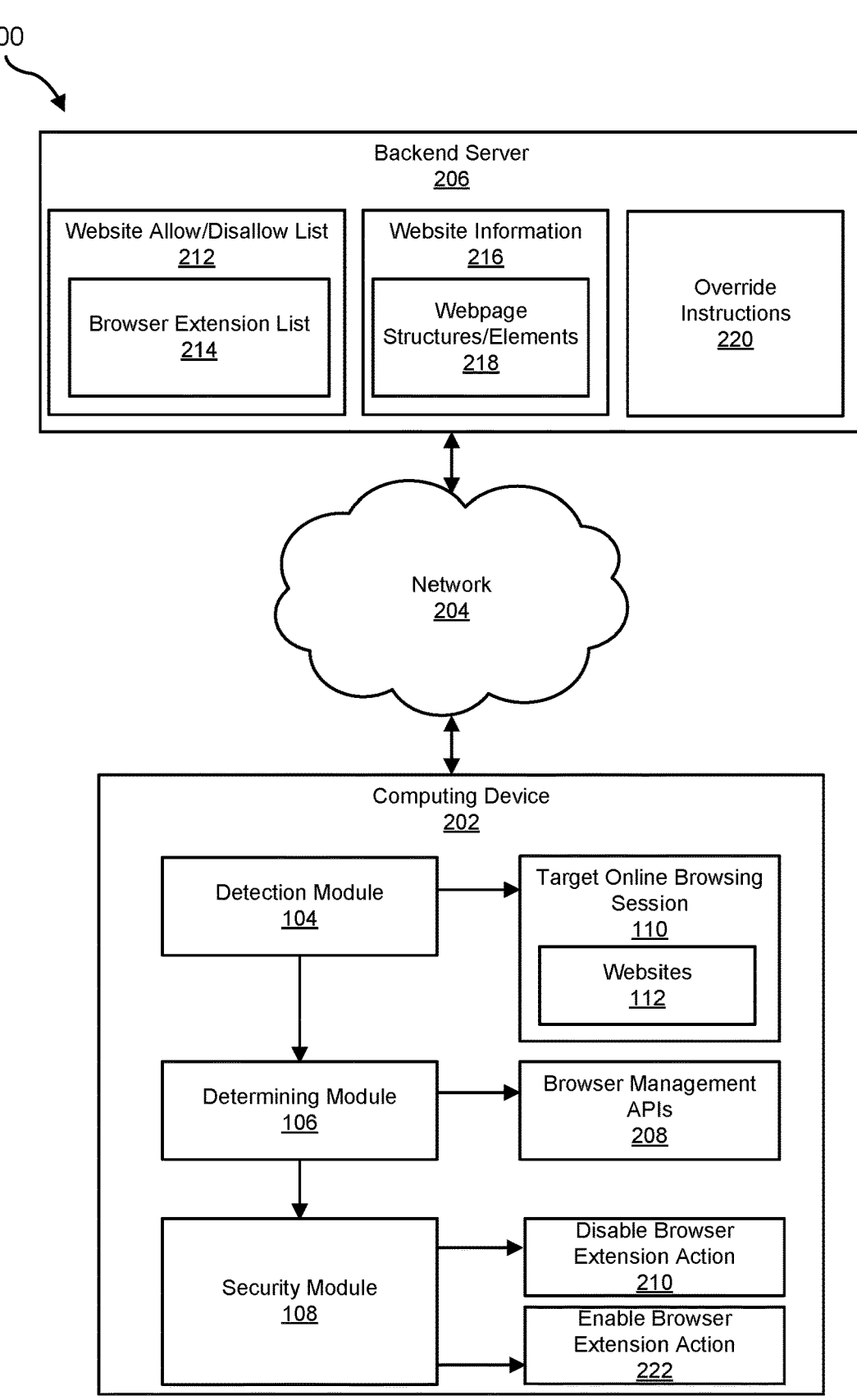
FIG. 2 is a block diagram of an additional example system for dynamically disabling third-party web browser extensions during online browsing sessions.

The following will provide, with reference to FIGS. 1-2, detailed descriptions of example systems for dynamically disabling third-party web browser extensions during online browsing sessions. Detailed descriptions of corresponding computer-implemented methods will also be provided in connection with FIGS. 3-4. In addition, a detailed description of example candidate website information that may be utilized in the example system of FIG. 2 will also be provided in connection with FIG. 5. In addition, a detailed description of an example browser window that may be utilized to perform the example method of FIG. 3 will also be provided in connection with FIG. 6. In addition, detailed descriptions of an example computing system and network architecture capable of implementing one or more of the embodiments described herein will be provided in connection with FIGS. 7 and 8, respectively.

FIG. 1 is a block diagram of an example system 100 for dynamically disabling third-party web browser extensions during online browsing sessions. As illustrated in this figure, example system 100 may include one or more modules 102 for performing one or more tasks. For example, and as will be explained in greater detail below, example system 100 may include a detection module 104 that detects initiation of a target online browsing session 110 including one or more websites 112. Example system 100 may additionally include a determining module 106 that determines browser extensions 114 associated with websites 112. Example system 100 may also include a security module 108 that performs a security action that protects against a data privacy invasion by disabling browser extensions 114 for a duration of target online browsing session 110. Although illustrated as separate elements, one or more of modules 102 in FIG. 1 may represent portions of a single module or application.

The term "target online browsing session" as used herein, may generally refer to user browsing activities including transactions associated with the collection of user private data (i.e., PII) on any of a number of web pages opened in a client web browser. Examples of transactions performed in a target online browsing session may include, without limitation, the collection of user financial information (e.g., credit card details, etc.), account login credentials, registration information, and or other PII in fields or forms in one or more web pages associated with a website.

The term "browser extensions" as used herein, may generally refer to any third-party software module utilized by a web browser that executes source code for performing one or more tasks during a browsing session. For example, third-party browser extensions may be installed in web browsers for enabling user interface modifications, cookie management, ad incorporation (e.g., pop-up ads), ad blocking, running custom scripts, and changing the style of web pages. In some examples, browser extensions may be configured to access sensitive data (e.g., user browsing history), alter web browser setting, add user interface items, and/or replace website content. In some examples, browser extensions may be installed in web browsers by users or, alternatively, installed by third-party applications without the user's knowledge (e.g., as malware).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or backend server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate dynamically disabling third-party web browser extensions during online browsing sessions. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with backend server 206 via a network 204. In one example, all or a portion of the functionality of modules 102 may be performed by computing device 202, backend server 206, and/or any other suitable computing system. As will be described in greater detail below, one or more of modules 102 from FIG. 1 may, when executed by at least one processor of computing device 202 and/or backend server 206, enable computing device 202 and/or backend server 206 to dynamically disable third-party web browser extensions during online browsing sessions. For example, and as will be described in greater detail below, detection module 104, determining module 106, and security module 108, may cause computing device 202 and/or backend server 206 to (i) detect initiation of target online browsing session 110 (including one or more websites 112), (ii) determine, utilizing browser management APIs 208, browser extensions 114 associated with websites 112, and (iii) perform a security action (i.e., disable browser extension action 210 and enable browser extension action 222) to protect against a data privacy invasion during online browsing sessions associated with critical transactions.

Computing device 202 generally represents any type or form of computing device capable of executing and/or reading computer-executable instructions. In some examples, computing device 202 may be an endpoint device configured to run safe web browsing and/or password manager application software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Backend server 206 generally represents any type or form of computing device that is capable of executing and/or reading computer-executable instructions. In some examples, backend server 206 may be a web server configured to provide various web services including storing website allow/disallow list 212, browser extension list, 214, website information 216, webpage structures/elements 218, and override instructions 220. Additional examples of backend server 206 include, without limitation, security servers, application servers, storage servers, and/or database servers configured to run certain software applications and/or provide various security, storage, and/or database services. Although illustrated as a single entity in FIG. 2, backend server 206 may include and/or represent a plurality of servers that work and/or operate in conjunction with one another.

Network 204 generally represents any medium or architecture capable of facilitating communication or data transfer. In one example, network 204 may facilitate communication between computing device 202 and backed server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
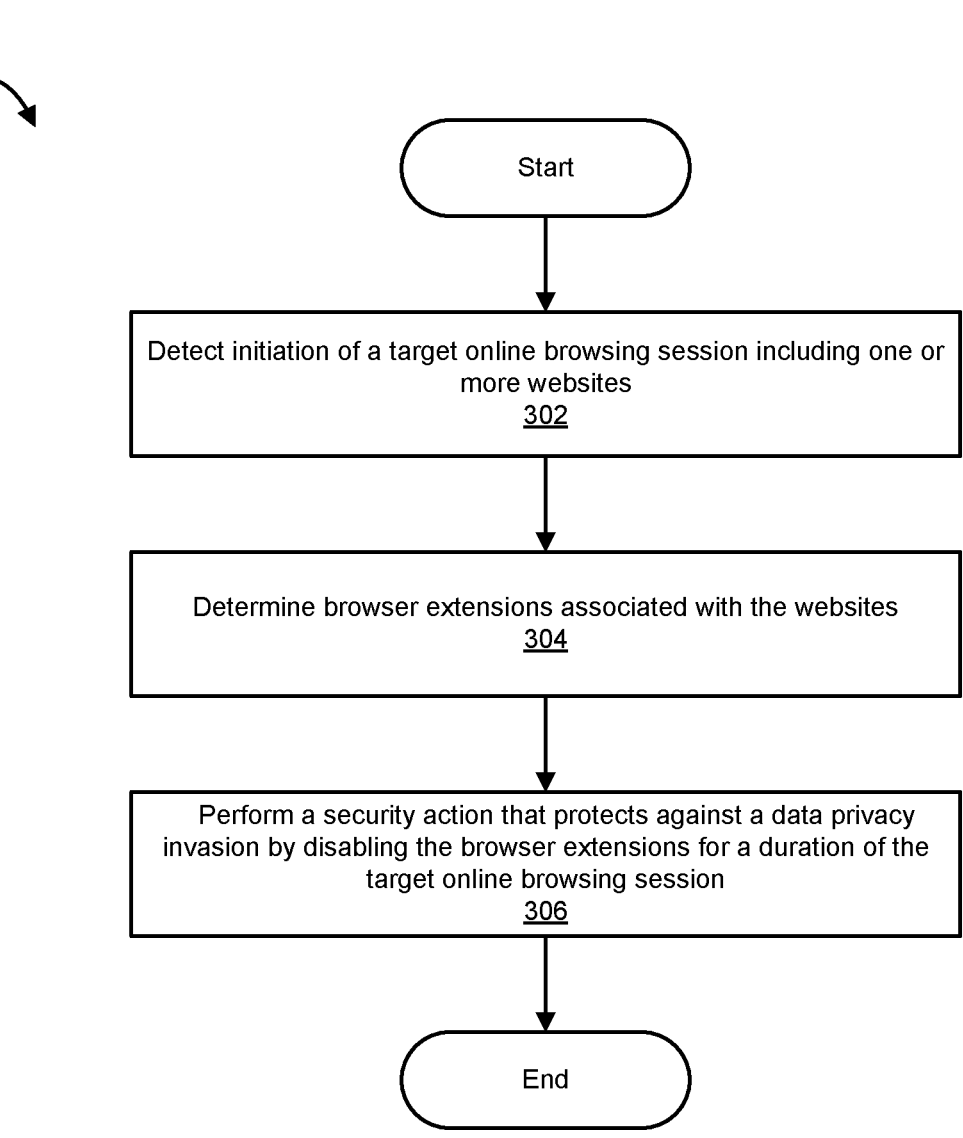
FIG. 3 is a flow diagram of an example method for dynamically disabling third-party web browser extensions during online browsing sessions.
Figure 4:
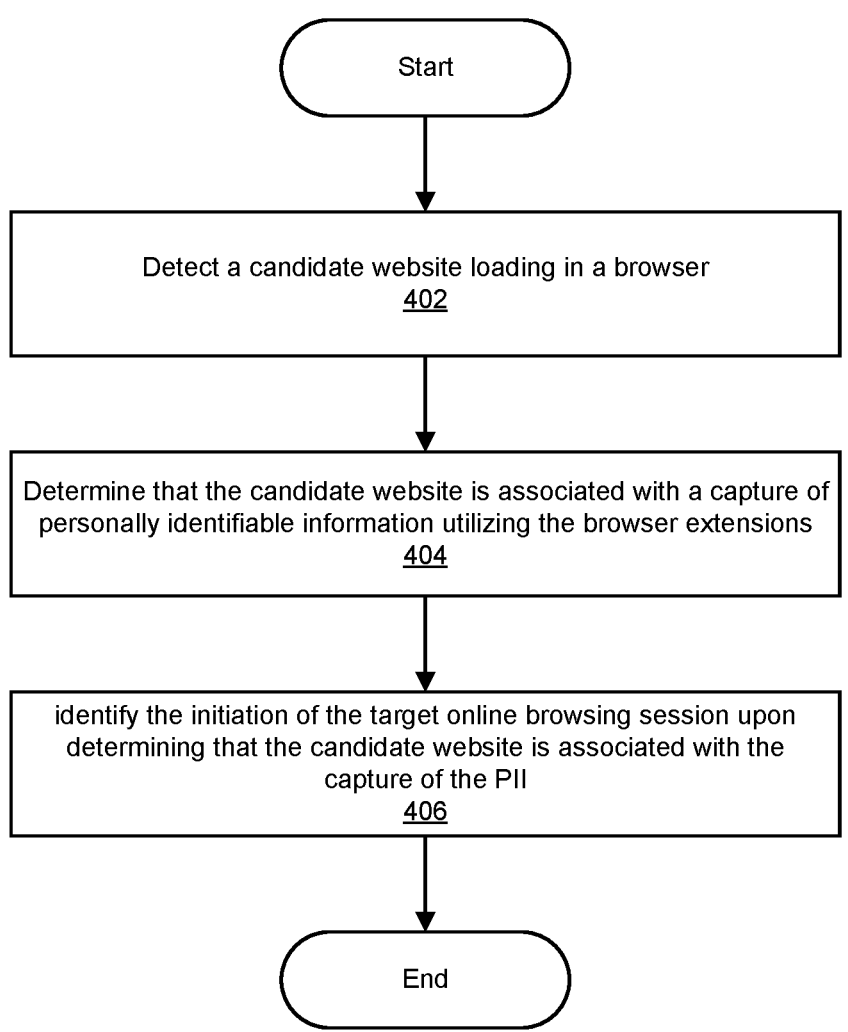
FIG. 4 is a flow diagram of an additional example method for dynamically disabling third-party web browser extensions during online browsing sessions.
Figure 5:
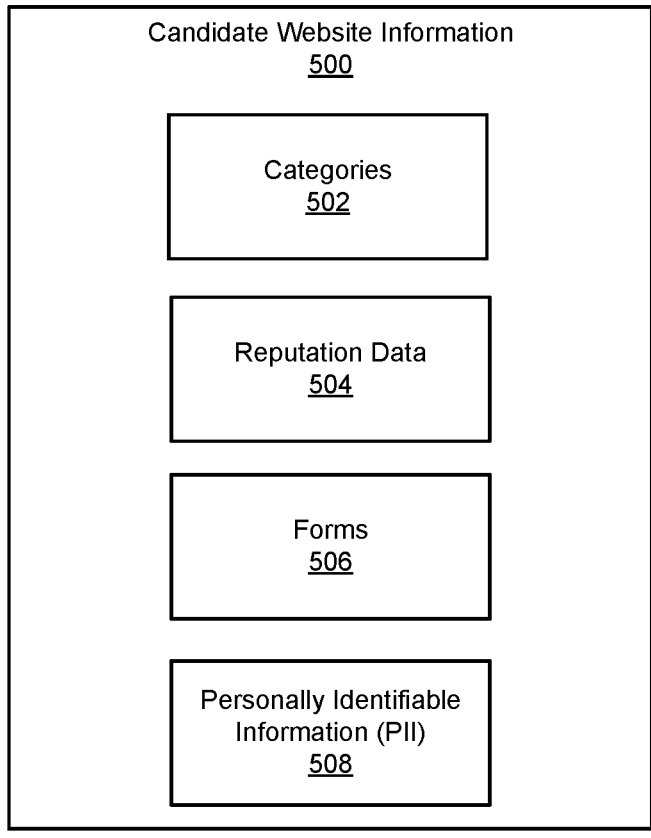
FIG. 5 is a block diagram of example candidate website information that may be utilized in the example system of FIG. 2.

FIGS. 3-4 are flow diagrams of example computer-implemented methods 300 and 400 for dynamically disabling third-party web browser extensions during online browsing sessions. The steps shown in FIGS. 3-4 may be performed by any suitable computer-executable code and/or computing system, including system 100 in FIG. 1, system 200 in FIG. 2, and/or variations or combinations of one or more of the same. In one example, each of the steps shown in FIGS. 3-4 may represent an algorithm whose structure includes and/or is represented by multiple sub-steps, examples of which will be provided in greater detail below.

As illustrated in FIG. 3, at step 302 one or more of the systems described herein may detect initiation of a target online browsing session including one or more websites. For example, detection module 104 may, as part of computing device 202 in FIG. 2, detect initiation of target online browsing session 110 including websites 112.

Detection module 104 may detect target online browsing session 110 in a variety of ways which will now be described with respect to FIG. 4. Turning now to FIG. 4, at step 402, one or more of the systems described herein may detect a candidate website loading in a browser. For example, detection module 104 may, as part of computing device 202 in FIG. 2, detect a URL for a website 112 (i.e., a candidate website) that has been entered into the address bar of a web browser window and which is being loading for display.

At step 404, one or more of the systems described herein may determine that the candidate website is associated with a capture of personally identifiable information (PII) utilizing the browser extensions. For example, detection module 104 may, as part of computing device 202 in FIG. 2, determine that the candidate website is associated with the capture of PII utilizing one or more browser extensions 114. Detection module 104 may make the aforementioned determination in a variety of ways based on, for example, candidate website information 500 in FIG. 5. In some examples, detection module may determine that the candidate website includes one or more forms 506 for receiving PII 508. Additionally or alternatively, detection module 104 may determine that the candidate website belongs to a website category (e.g., one or more categories 502) associated with capturing PII 508. Additionally or alternatively, detection module 104 may query a reputation database for reputation data 504 associated with the candidate website and determine that the candidate website is associated with the capture of PII 508 based on reputation data 504. In some examples, detection module 104 may be configured to fetch candidate website information 500 from backend server 206. Additionally or alternatively, detection module 104 may be configured to retrieve web page form structures elements 218 that are associated with the loading of the candidate website and which further may be utilized for receiving PII 508.

At step 406, one or more of the systems described herein may identify the initiation of the target online browsing session upon determining that the candidate website is associated with the capture of the PII. For example, detection module 104 may, as part of computing device 202 in FIG. 2, identify target online browsing session 110 upon determining that a website 112 is associated with the capture of the PII.

Returning now to FIG. 3, at step 304, one or more of the systems described herein may determine browser extensions associated with the websites in the target online browsing session detected at step 302. For example, determining module 106 may, as part of computing device 202 in FIG. 2, determine browser extensions 114 associated with websites 112 in target online browsing session 110.

Determining module 106 may detect browser extensions 114 in a variety of ways. In some examples, determining module 106 may call a browser management API 208 to retrieve browser extension list 214, from backend server 206, to identify all browser extensions 114 installed in a web browser displaying websites 112. For example, determining module 106 may call the API "browser.management. getAll( )" to retrieve all of the installed extensions for a web browser during target online browsing session 110.

At step 306, one or more of the systems described herein may perform a security action that protects against a data privacy invasion by disabling the browser extensions for a duration of the target online browsing session. For example, security module 108 may, as part of computing device 202 in FIG. 2, perform disable browser extension action 210 to disable all browser extensions 114 determined at step 304.

Security module 108 may perform disable browser extension action 210 in a variety of ways. In some examples, security module 108 may call a browser management API 208 configured to both enable and disable browser extensions (e.g., "browser.management.setEnable(id, enabled)") for a duration of target online browsing session 110. Additionally or alternatively, security module 108 may retrieve a list of allowable browser extensions (e.g., from browser extension list 214 in website allow/disallow list 212), compare browser extensions 114 to the list, and then disable (utilizing a browser management API 208) only those browser extensions 114 that do not match the list of allowable browser extensions for the duration of target online browsing session 110. Additionally, security module 108 may maintain (i.e., not disable) any browser extensions 114 that do match the list of allowable browser extensions for the duration of the target online browsing session.

In some examples, after disabling browser extensions 114, security module 108 may detect a termination of target online browsing session 110 and then reenable browser extensions 114 by calling a management browser API 208 (e.g., "browser.management.setEnable (id, enabled)"). Security module 108 may detect the termination of target online browsing session 110 in a variety of ways. In some examples, security module 108 may detect the termination of target online browsing session 110 upon a user exiting a browser application. Additionally or alternatively, security module 108 may detect the termination of target online browsing session 110 by identifying a browser session tab (e.g., where a user is browsing a financial services website) associated with target online browsing session 110 as an active tab. Then, security module 108 may detect a selection of another browser session tab (e.g., where the user is browsing a search engine website) associated with a non-target online browsing session. Next, security module 108 may update/designate the non-target online browsing session as belonging to the active tab and target online browsing session 110 as belonging to an inactive tab. Finally, security module 108 may reenable browser extensions 114 in the inactive tab by calling a browser management API 208. In some examples, security module 108 may be configured to generate an alert to a browser user that a critical transaction is potentially at risk when browser extensions 114 have been reenabled in the inactive tab. In some examples, security module 108 may persist disabled browser extensions 114 in the inactive tab (instead of reenabling them).

In one example, security module 108 may be configured to receive override instructions 220 from a browser user based on a set of browser extensions 114 the user has designated to be allowed (e.g., an "allow list" within browser extension list 214 in website allow/disallow list 212) during any target online browsing session 110. In this example, security module 108 may refrain from disabling any browser extensions 114 based on received overside instructions 220.

Figure 6:
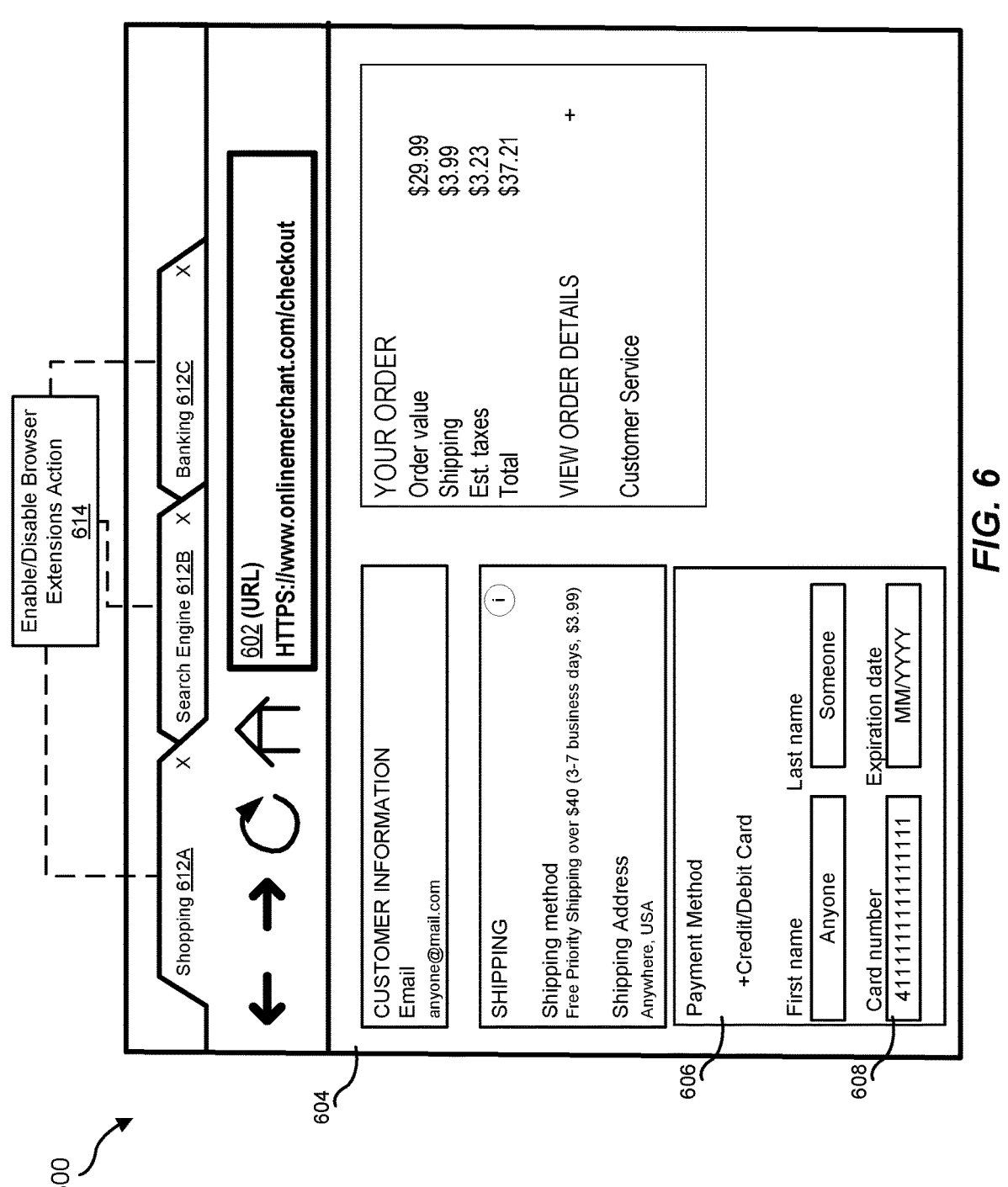
FIG. 6 is a block diagram of an example browser window that may be utilized to perform the example method of FIG. 3.

FIG. 6 is an example bowser window 600 showing an example target online transaction session. Browser window 600 includes browser tabs 612A (i.e., Shopping tab 612A), 612B (i.e., Search Engine tab 612B), and 612C (i.e., Banking tab 612C). In browser window 600, Shopping tab 612A is currently displayed as an active tab, as identified by URL 602, and includes web page 604 displaying a payment form 606 for retrieving PII (e.g., customer credit card information 608). Additionally, in browser window 600, Search Engine tab 612B and Banking tab 612C are inactive tabs. As discussed above in the description of FIG. 3, an enable/ disable browser extensions action 614 may be applied to each of the tabs 612A, 612B, and 612C. For example, all browser extensions executing in the active Shopping tab 612A may be disabled by enable/disable browser extensions action 614 based on the collection of PII in form 606 of web page 604. Additionally, any browser extensions executing in Search Engine tab 612B may be persisted (i.e., not disabled) either because Search Engine tab 612B is an inactive tab and/or the associated web page is not associated with the collection of PII (and therefore does not pose a data privacy risk). Additionally, in some examples, browser extensions executing in Banking tab 612C may be disabled (because Banking tab 612C may be associated with the collection of PII), even though it is a currently inactive tab, because it is still open in browser window 600. Alternatively, browser extensions executing in Banking tab 612C may be persisted (e.g., with an optional data privacy invasion risk alert generated for the browser user) based on it being an inactive tab.

As explained above in connection with example method 300 in FIG. 3, the systems and methods herein may temporarily disable third-party browser extensions during online transaction sessions and then re-enable the extensions when the sessions are completed. A security browser extension may be utilized to detect the loading of a web page utilizing forms (e.g., login forms, registration forms, forms for receiving personally identifiable information, etc.), mark loading of the web page as the start of an online transaction session, call browser management APIs to programmatically disable any third-party browser extensions until the online transaction session has ended (e.g., upon the closing of a web page tab in a browser, navigation to a different URL, or following the submission of a web page form). The online transaction session may be detected by periodically retrieving new/updated website information, web page form structures, and web page elements from a backend server. The systems and methods herein may also provide user options to override the disabling of third-party browser extensions for selected websites (e.g., websites stored in a whitelist or blacklist) to customize secure private browsing.

Figure 7:
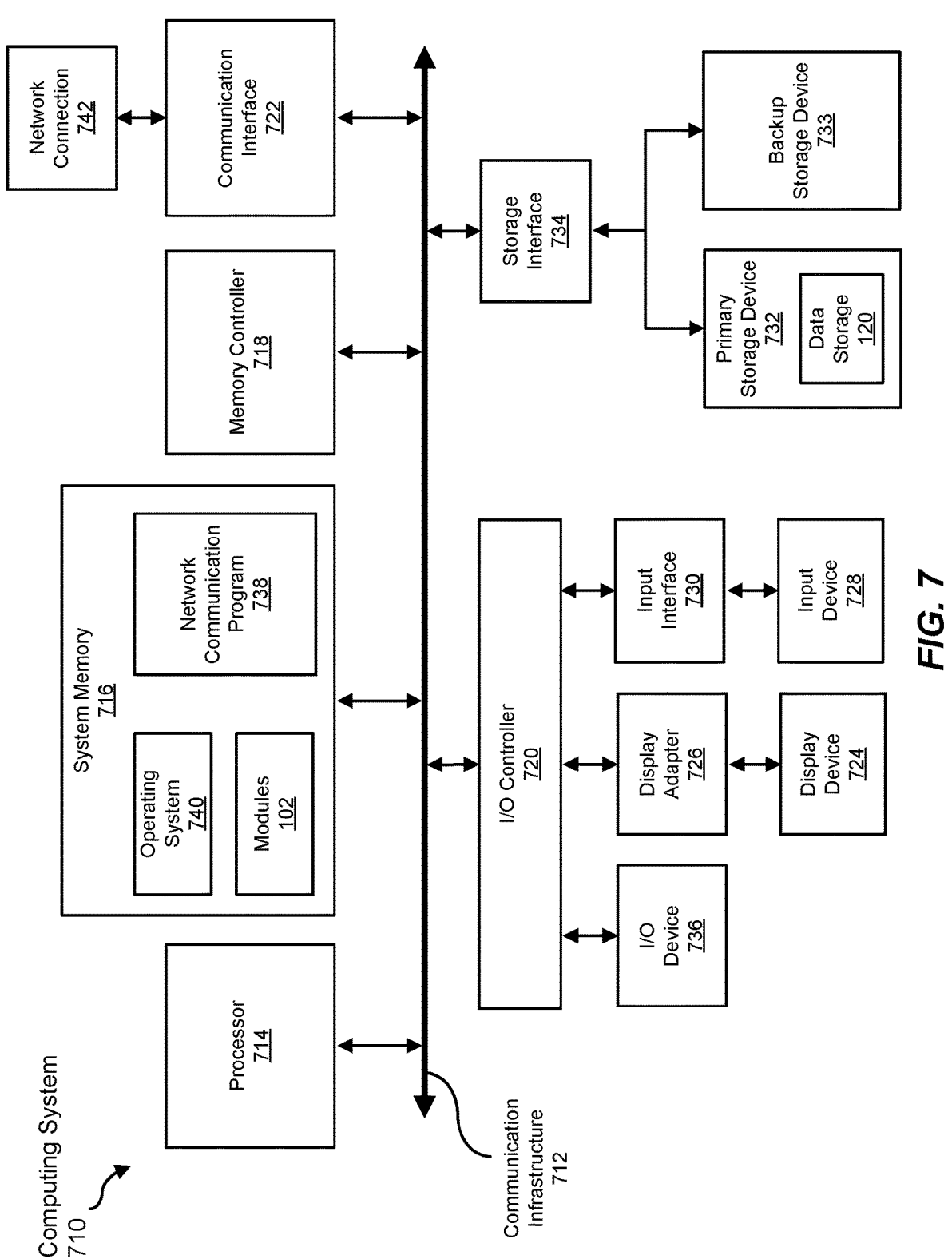
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data storage 120 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
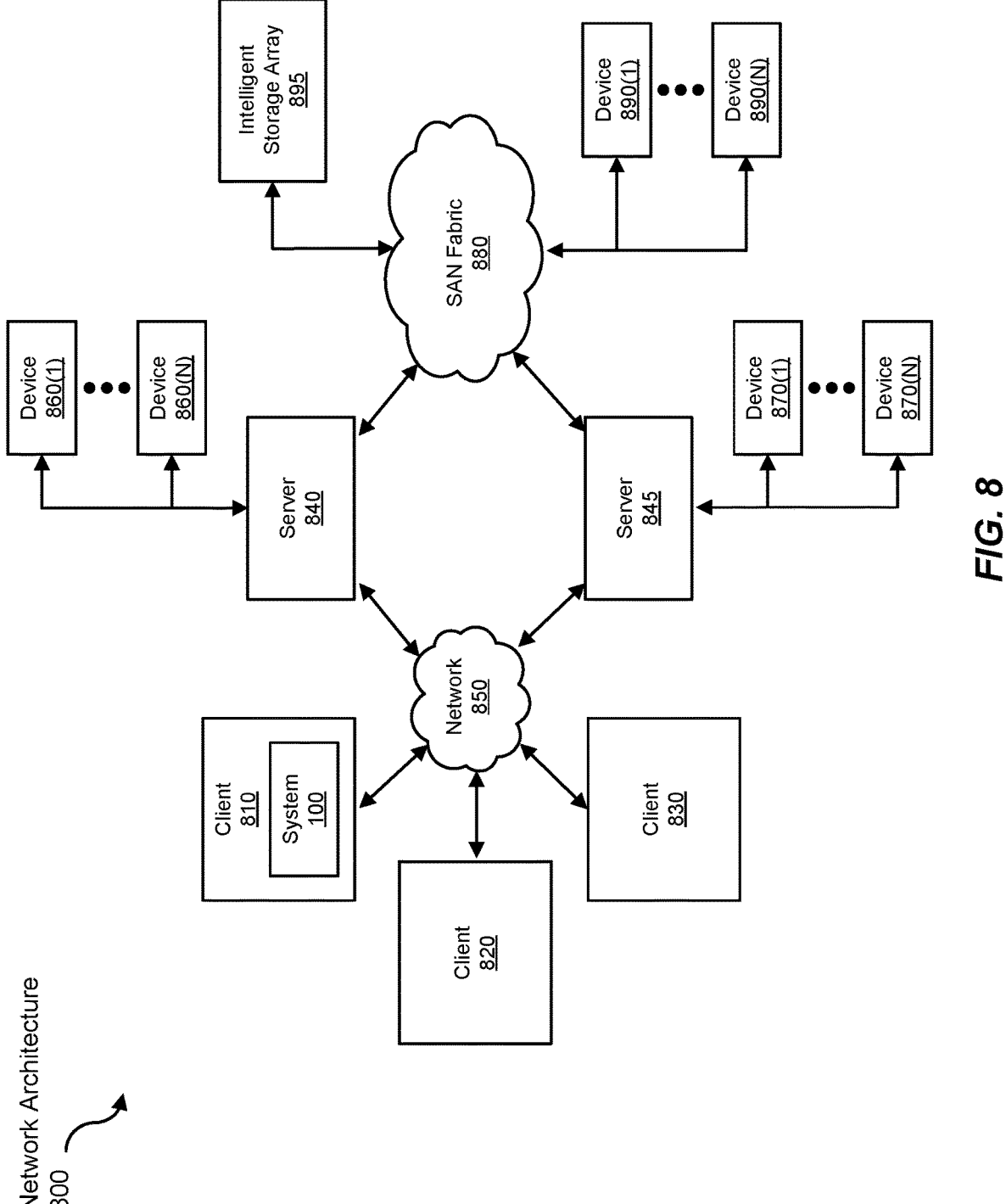
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for dynamically disabling third-party web browser extensions during online browsing sessions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically disabling third-party web browser extensions during online browsing sessions, at least a portion of the method being performed by one or more computing devices comprising at least one processor, the method comprising:

detecting, by the one or more computing devices, initiation of a target online browsing session comprising one or more websites;

determining, by the one or more computing devices, one or more browser extensions associated with the websites; and performing, by the one or more computing devices, a security action that protects against a data privacy invasion for the target online browsing session independently from a non-target online browsing session by:

disabling the browser extensions for the target online browsing session with the one or more websites;

detecting an end of the target online browsing session ending with the one or more websites; and reenabling the disabled browser extensions in response to detecting the end of the target online browsing session with the one or more websites.

2. The computer-implemented method of claim 1, wherein detecting the initiation of the target online browsing session comprises:

detecting a candidate website loading in a browser;

determining that the candidate website is associated with a capture of personally identifiable information (PII) utilizing the browser extensions; and identifying the initiation of the target online browsing session upon determining that the candidate website is associated with the capture of the PII.

3. The computer-implemented method of claim 2, wherein determining that the candidate website is associated with the capture of PII utilizing the browser extensions comprises determining that the candidate website comprises one or more forms for receiving the PII.

4. The computer-implemented method of claim 2, wherein determining that the candidate website is associated with the capture of PII utilizing the browser extensions comprises determining that the candidate website belongs to a website category associated with capturing the PII.

5. The computer-implemented method of claim 2, wherein determining that the candidate website is associated with the capture of PII utilizing the browser extensions comprises:

querying a reputation database for reputation data associated with the candidate website; and determining that the candidate website is associated with the capture of the PII based on the reputation data.

6. The computer-implemented method of claim 1, wherein determining the browser extensions associated with the websites comprises calling a browser management application programming interface (API) to retrieve a list of the browser extensions.

7. The computer-implemented method of claim 1, wherein performing the security action comprises calling one or more browser management APIs configured to disable the browser extensions for a duration of the target online browsing session.

8. The computer-implemented method of claim 1, wherein performing the security action further comprises:

detecting a termination of the target online browsing session corresponding to a duration of the target online browsing session ending; and reenabling the browser extensions following the termination of the target online browsing session.

9. The computer-implemented method of claim 1, wherein performing the security action comprises:

retrieving a list of allowable browser extensions;

comparing the browser extensions associated with the websites to the list of the allowable browser extensions;

maintaining the browser extensions matching the list of the allowable browser extensions for a duration of the target online browsing session; and disabling the browser extensions not matching the list of the allowable browser extensions for the duration of the target online browsing session.

10. The computer-implemented method of claim 1, wherein performing the security action further comprises:

identifying a browser session tab associated with the target online browsing session as an active tab;

detecting a selection of another browser session tab associated with the non-target online browsing session;

updating the another browser session tab as the active tab and the browser session tab as an inactive tab corresponding to the target online browsing session ending; and persisting the reenabled browser extensions associated with the target online browsing session in the inactive tab.

11. The computer-implemented method of claim 1, wherein performing the security action further comprises:

identifying a browser session tab associated with the target online browsing session as an active tab;

detecting a selection of another browser session tab associated with the non-target online browsing session;

updating the another browser session tab as the active tab and the browser session tab as an inactive tab corresponding to a duration of the target online browsing session ending; and disabling the browser extensions associated with the target online browsing session in the inactive tab based on the another browser session tab.

12. A system for dynamically disabling third-party web browser extensions during online browsing sessions, the system comprising:

at least one physical processor; and physical memory comprising computer-executable instructions and one or more modules that, when executed by the physical processor, cause the physical processor to:

detect, by a detection module, initiation of a target online browsing session comprising one or more websites;

determine, by a determining module, one or more browser extensions associated with the websites; and perform, by a security module, a security action that protects against a data privacy invasion for the target online browsing session independently from a non-target online browsing session by:

disabling the browser extensions for the target online browsing session with the one or more websites;

detecting an end of the target online browsing session ending with the one or more websites; and reenabling the disabled browser extensions in response to detecting the end of the target online browsing session with the one or more websites.

13. The system of claim 12, wherein the detection module detects the initiation of the target online browsing session by:

detecting a candidate website loading in a browser;

determining that the candidate website is associated with a capture of personally identifiable information (PII) utilizing the browser extensions; and identifying the initiation of the target online browsing session upon determining that the candidate website is associated with the capture of the PII.

14. The system of claim 13, wherein the determining module determines that the candidate website is associated with the capture of PII utilizing the browser extensions by determining that the candidate website comprises one or more forms for receiving the PII.

15. The system of claim 13, wherein determining modules determines that the candidate website is associated with the capture of PII utilizing the browser extensions by determining that the candidate website belongs to a website category associated with capturing the PII.

16. The system of claim 13, wherein the determining module determines that the candidate website is associated with the capture of PII utilizing the browser extensions by:

querying a reputation database for reputation data associated with the candidate website; and determining that the candidate website is associated with the capture of the PII based on the reputation data.

17. The system of claim 12, wherein the determining module determines the browser extensions associated with the websites comprises calling a browser management application programming interface (API) to retrieve a list of the browser extensions.

18. The system of claim 12, wherein the security module performs the security action by calling one or more browser management APIs configured to disable the browser extensions for a duration of the target online browsing session.

19. The system of claim 12, wherein the security module further performs the security action by:

detecting a termination of the target online browsing session corresponding to a duration of the target online browsing session ending; and reenabling the browser extensions following the termination of the target online browsing session.

20. A non-transitory computer-readable medium comprising one or more computer-executable instructions that, when executed by at least one processor of a computing device, cause the computing device to:

detect initiation of a target online browsing session comprising one or more websites;

determine one or more browser extensions associated with the websites; and perform a security action that protects against a data privacy invasion for the target online browsing session independently from a non-target online browsing session by:

disabling the browser extensions for the target online browsing session with the one or more websites;

detecting an end of the target online browsing session ending with the one or more websites; and reenabling the disabled browser extensions in response to detecting the end of the target online browsing session with the one or more websites.

* * * * *